United States Patent [19]

Shepherd et al.

[11] 4,128,362

[45] Dec. 5, 1978

[54] FLUSHING AND COOLING SYSTEM FOR PUMPS

[75] Inventors: Wilburn O. Shepherd, Whittier; Jonathon C. Gaslow, La Palma, both of Calif.

[73] Assignee: Dresser Industries, Inc., Dallas, Tex.

[21] Appl. No.: 790,159

[22] Filed: Apr. 22, 1977

[51] Int. Cl.$^2$ ............................................. F01D 11/10
[52] U.S. Cl. ..................................... 415/112; 415/176
[58] Field of Search ............... 415/112, 116, 175, 176; 277/3, 74, 134

[56] References Cited

U.S. PATENT DOCUMENTS

| | | | |
|---|---|---|---|
| 1,737,870 | 12/1929 | Telfer | 415/112 |
| 2,283,131 | 5/1942 | Shaw et al. | 415/176 |
| 2,604,257 | 7/1952 | Church et al. | 415/112 |
| 3,128,713 | 4/1964 | Nechine | 415/112 |
| 3,182,897 | 5/1965 | Trumpler | 415/112 |
| 3,213,798 | 10/1965 | Carswell | 415/176 |
| 3,257,957 | 6/1966 | Tracy | 415/112 |
| 3,370,542 | 2/1968 | Harney | 415/176 |
| 3,999,882 | 12/1976 | Purton | 415/112 |

Primary Examiner—C. J. Husar
Attorney, Agent, or Firm—Roy L. Van Winkle; John N. Hazelwood

[57] ABSTRACT

An improved flushing and cooling system for shaft seals that are located in cavities in the pump housing includes inlet and discharge ports extending through the housing into the seal cavities and a pumping ring seal that is arranged to circulate the fluid through the inlet port past the seal and outwardly from the outlet port into the housing of the pump. Both ends of the housing can be provided with such a system and the systems interconnected internally of the housing to balance the pressure therebetween.

5 Claims, 2 Drawing Figures

FLUSHING AND COOLING SYSTEM FOR PUMPS

BACKGROUND OF THE INVENTION

This invention relates generally to improved flushing and cooling systems for the shaft seals of pumps. More particularly, but not by way of limitation, this invention relates to an improved flushing and cooling system for shaft seals and pumps wherein the system is located entirely within the pump housing.

U.S. Pat. No. 3,999,882 issued Dec. 28, 1976, to Robert M. Purton, illustrates a flushing and cooling system for shaft seals and represents one approach that has been taken in an effort to reduce or eliminate the necessity for heat exchangers, valves, piping, etc. on the exterior of the pump housing, that are necessary to circulate the fluid being pumped to the seals to cool and flush the seals.

An object of this invention is to provide an effective flushing and cooling system for the seals of the pumps.

Another object of the invention is to provide an improved flushing and cooling system for shaft seals and pumps that eliminates the necessity for external piping.

SUMMARY OF THE INVENTION

This invention provides an improved flushing and cooling system for shaft seals of pumps that include a shaft carrying an impeller for moving liquid through the pump and a hollow housing journaled in the shaft. The housing is provided with inlet and discharge openings. The improvement comprises an enclosed seal cavity that is formed in the housing and encircles a portion of the shaft; inlet and outlet ports in the housing provides fluid communication between the interior of the housing and the cavity; and, seal means located in the cavity for forming a seal between the housing and the shaft wherein the seal means includes pumping means rotatable with the shaft for moving fluid from the interior of the housing through the inlet port, past the seal means for flushing and cooling the seal means, and outwardly through the outlet port back into the interior of the housing.

BRIEF DESCRIPTION OF THE DRAWING

The foregoing and additional objects and advantages of the invention will become more apparent when the following detailed description is read in conjunction with the accompanying drawing wherein the reference characters denote like parts in all views and wherein.

DETAILED DESCRIPTION OF THE PREFERRED EMBODIMENT.

Figure 1:
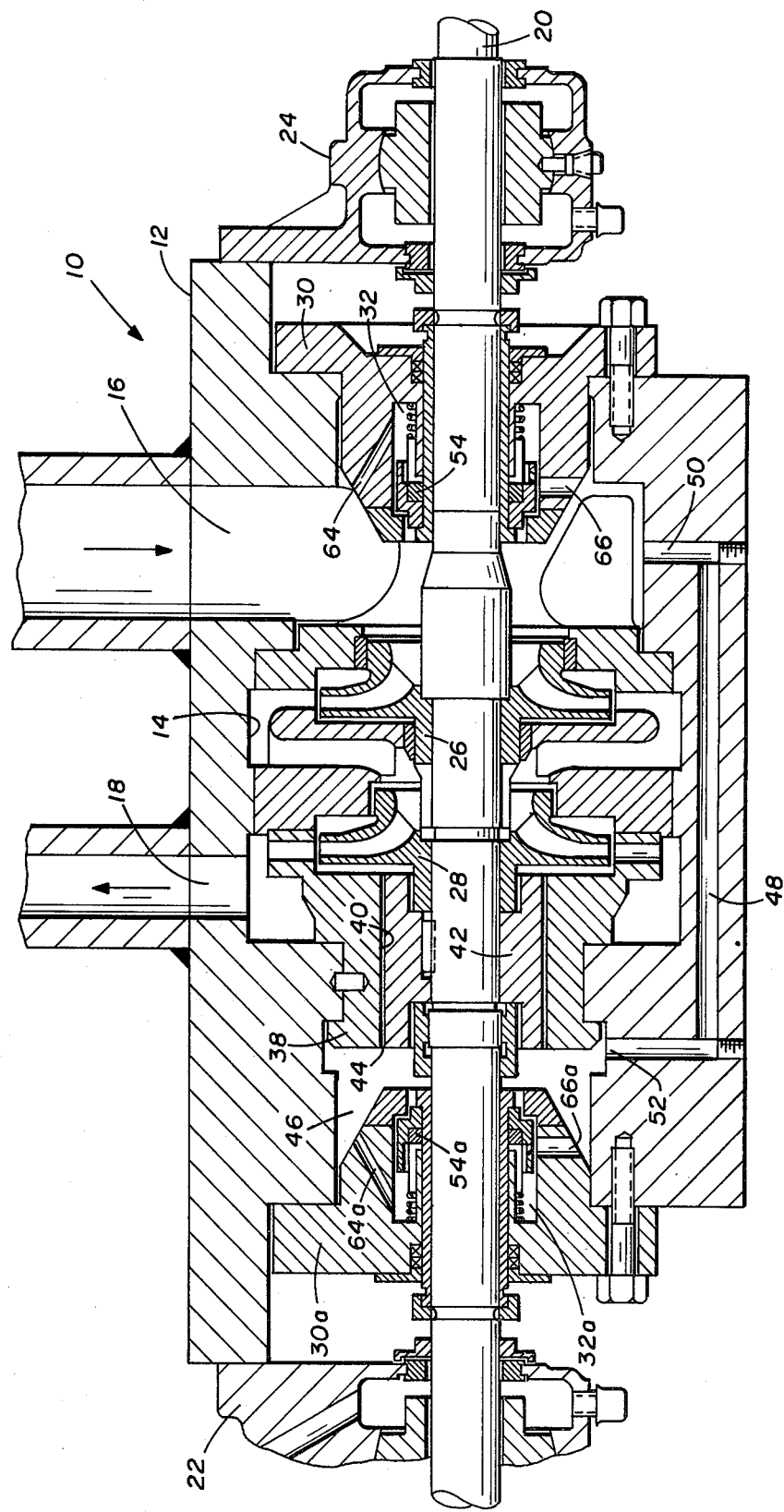
FIG. 1 is a simplified, vertical cross-section view of a pump including a seal flushing and cooling system that is constructed in accordance with the invention; and, FIG. 2 is an enlarged, fragmentary cross-sectional view illustrating in more detail the seal arrangement utilized in the flushing and cooling system of this invention.

Referring to the Drawing, and to FIG. 1 in particular, shown therein and generally designated by the reference character 10, is a pump including an improved flushing and cooling system that is constructed in accordance with the invention. The pump 10 includes a hollow housing 12 which, in actual practice, will be constructed from a multiplicity of parts. The housing 12 includes a hollow interior 14, an inlet passageway 16 and extends through the wall of the housing 12 to the interior 14, and a discharge passageway 18 that also extends through the wall of the housing into the interior 14.

A shaft 20 is journaled by bearings 22 and 24 that are illustrated as being mounted on the housing 12. The shaft 20 extends through the housing 12, carries impellers 26 and 28 thereon which are provided to move fluid from the inlet passageway 16 through the interior 14 of the housing 12 and outwardly through the discharge passageway 18 at an increased pressure. The illustrated pump 10 can be generally described as being of the two-stage, centrifugal type.

Comprising part of the housing 12 is a seal housing 30 that has a seal cavity 32 formed therein. It will be noted that the seal housing 30 is located adjacent to the inlet passageway 16. A second seal housing 30a is located adjacent to the discharge passageway 18 of the pump 10. A seal cavity 32a is formed in the seal housing 30a.

The seal housings 30 and 30a are substantially identical in construction, although oriented in opposite directions in the pump 10. Since the structures are substantially identical, the subscript "a" will be utilized to identify like portions of the housing 30a as compared to the housing 30. The seal housing 30 will be more fully described in connection with the description of FIG. 2.

The pump 10, adjacent the discharge passageway 18 includes a pressure reducing device that consists of an annular body portion 38 that is non-rotatable with respect to the housing 10. The member 38 includes a bore 40 that is sized to receive an annular rotating member 42 forming a passageway 44 therebetween. The structure and arrangement of the members 38 and 42 forming the passageway 44 are such that as liquid flows from the discharge into a chamber 46, formed adjacent the seal housing 30a, the pressure is reduced below that of liquid in the discharge.

A pressure balancing conduit 48 is formed in the housing 12. One end 50 of the conduit 48 is in fluid communication with the inlet passageway 16 and the opposite end 52 thereof is in communication with the chamber 46. The arrangement is such that the conduit 48 provides a means of balancing the pressure in the chamber 46 with that in the inlet passageway 16.

Figure 2:
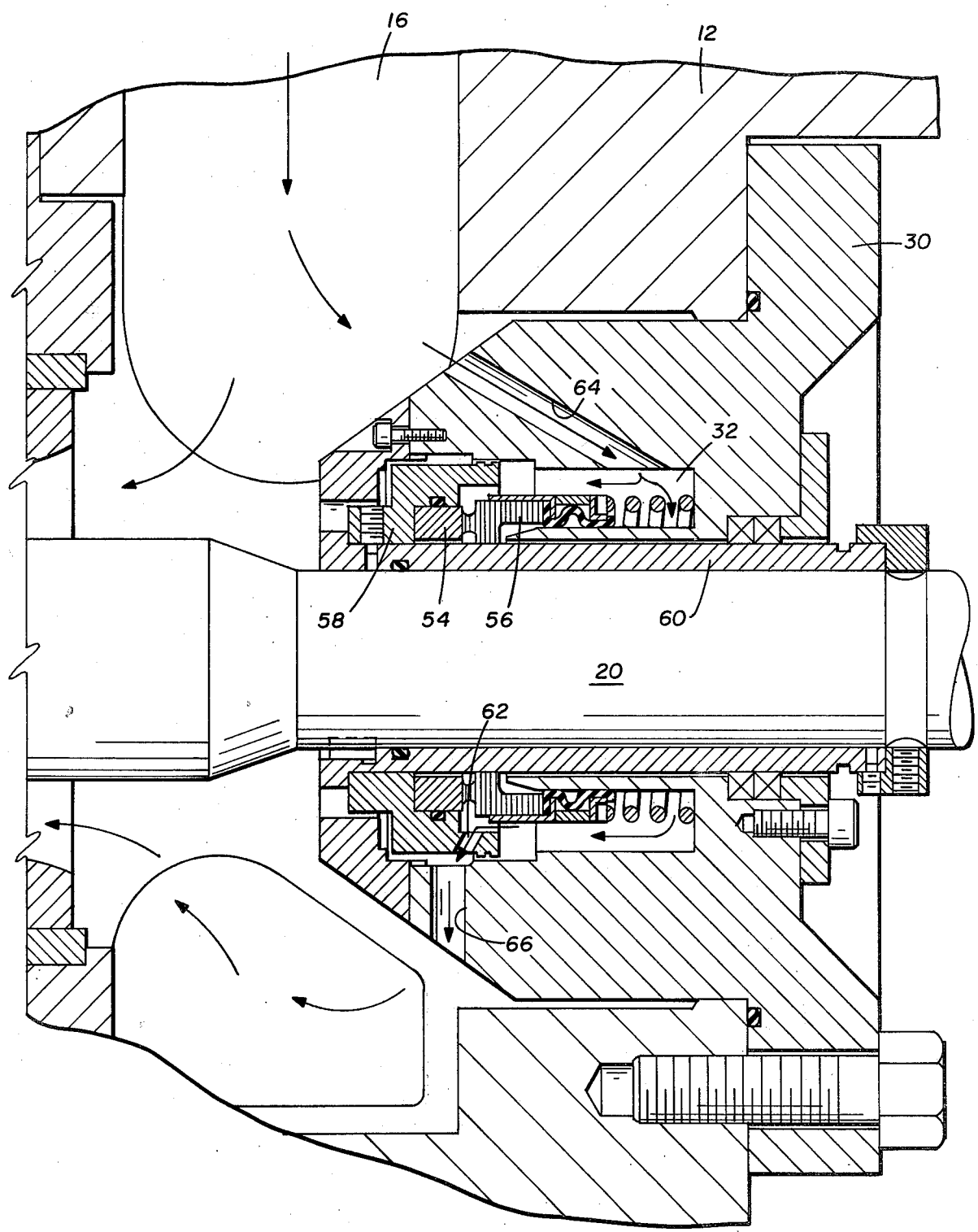

FIG. 2 illustrates the structure of the seal housing 30 in more detail. As previously mentioned, the seal housing 30a is substantially identical in construction although oriented in the opposite direction on the shaft 20.

As shown in FIG. 2, the cavity 32 in the seal housing 30 is sized to receive a pumping seal assembly 54. The seal assembly 54 includes a non-rotating, spring biased, annular seal member 56 that is in sealing engagement with an annular pumping element 58.

The annular pumping element 58 is secured to a sleeve 60 that is in turn secured to the exterior of the shaft 20. Accordingly, the sleeve 60 and the annular pumping element 58 rotate with the shaft 20 relative to the spring biased seal member 56. The rotating seal element 58 is provided with a plurality of passageways 62 extending therethrough that cause the flow of liquid from the suction passageway 16 in the cavity 32 through a port 64 formed in the seal housing 30. The liquid is pumped by the element 58 outwardly through a discharge port 66 that is also formed in the seal housing 30. Liquid flowing through the port 66 passes from the cavity 32 into the interior 14 of the pump housing 12, i.e., into the inlet passageway 16 of the pump 10.

OPERATION OF THE PREFERRED EMBODIMENT OF THE INVENTION

With the shaft 20 being rotated by driving apparatus, such as electric motor, the impellers 26 and 28 mounted thereon are also rotating relative to the housing 12. Liquid is drawn into the pump 10 through the inlet passageway 16 passing through the impeller 26 and then through the impeller 28 to the discharge passageway 18. Liquid within the pump 10 is prevented from passing outwardly of the housing 12 past the shaft 20 due to the seal assembly 54 adjacent the inlet passageway 16 and a similar seal assembly 54a that is located adjacent the discharge passageway 18.

To provide proper cooling and flushing of the seal assemblies, liquid from the inlet passageways 16 is drawn into the cavity 32 through the port 64 in the housing 30 by action of the rotating seal element 58 and driven therefrom through the port 66 from which the liquid returns to the inlet area of the pump 10. Thus, an adequate and fresh supply of liquid is being passed over the seal assembly 54 to flush and cool the seals. Similarly, liquid in the discharge passageway 18 passes through the passageway 44 through the pressure reducing means into the chamber 46 adjacent the seal assembly 54a located at the discharge end of the pump 10. The seal assembly 54a is also flushed, cooled and lubricated by a constant supply of liquid from the pump 10 as the rotating pumping element 58 pumps fluid from the chamber 46 through the port 64a into the cavity 32a and outwardly through the port 66a into the cavity 46. To assure that the pressure in the chamber 46 is at or very near at inlet pressure, the chamber 46 is in fluid communication with the inlet passageway 16 or inlet area of the pump 10 via the conduit 48 as previously described.

From the foregoing, it will be appreciated that the flushing and cooling system for the seals described in detail hereinbefore, requires no external apparatus. This is a particular advantage when corrosive, caustic or other dangerous materials are being pumped. The absence of external apparatus eliminates the requirement for high pressure external piping, heat exchangers, valves, etc. and the inherent threaded or welded connections which may develop leaks. Further, the improved flushing and cooling system described can be less expensively constructed by virtue of the elimination of all the external piping and fittings that are normally utilized in such systems.

It will be understood that the foregoing detailed description is an example of one embodiment of the invention and many modifications and changes can be made thereto without departing from the spirit of the invention.

The embodiments of the invention in which an exclusive property or privilege is claimed are defined as follows:

1. An improved flushing and cooling system for shaft seals in pumps that include a shaft carrying an impeller for moving liquid through the pump, a hollow housing journaling the shaft, the housing having inlet and discharge openings therein, the improvement comprising:
    an enclosed seal cavity formed in the housing encircling a portion of the shaft;
    inlet and outlet ports in the housing providing fluid communication between the interior of the housing and said cavity; and,
    seal means located in said cavity for forming a seal between the housing and shaft, said seal means including pumping means rotatable with said shaft for moving fluid from the interior of the housing through said inlet port, past said seal means for flushing and cooling said seal means, and outwardly through said outlet port to the interior of the housing whereby the fluid being pumped is utilized to cool and lubricate said seal means.

2. The improved flushing and cooling system of claim 1 wherein the inlet and outlet ports are in communication with the interior of the housing adjacent said inlet opening.

3. The improved flushing and cooling system of claim 1 and also including pressure reducing means adjacent the discharge opening and wherein the inlet and outlet ports are in communication with the interior of the housing through said pressure reducing means.

4. The improved flushing and cooling system of claim 2 and also including:
    pressure reducing means adjacent the discharge opening;
    a second enclosed seal cavity formed by the housing and encircling another portion of the shaft, said second seal cavity having second inlet and discharge ports providing fluid communication between said second seal cavity and the interior of the housing through said pressure reducing means; and,
    second seal means located in said second seal cavity for forming a seal between the housing and shaft, said seal means including second pumping means rotatable with the shaft for moving liquid from the interior of the housing through said second inlet port, past said second seal means and out of said second outlet port into the interior of the housing.

5. The improved flushing and cooling system of claim 4 and also including a passageway means formed interiorly of and extending through the housing for providing fluid communication between the interior of the housing adjacent the discharge and inlet openings.

* * * * *